(12) United States Patent
Di Nallo et al.

(10) Patent No.: US 10,903,566 B2
(45) Date of Patent: Jan. 26, 2021

(54) ELECTRONIC DEVICE ANTENNAS FOR PERFORMING ANGLE OF ARRIVAL DETECTION

(71) Applicant: Apple Inc., Cupertino, CA (US)

(72) Inventors: Carlo Di Nallo, Belmont, CA (US); Mattia Pascolini, San Francisco, CA (US); Aaron J. Cooper, San Jose, CA (US); Amin Tayebi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 588 days.

(21) Appl. No.: 15/718,288

(22) Filed: Sep. 28, 2017

(65) Prior Publication Data

US 2019/0097317 A1    Mar. 28, 2019

(51) Int. Cl.
| | |
|---|---|
| *H01Q 3/26* | (2006.01) |
| *H01Q 13/16* | (2006.01) |
| *H01Q 1/24* | (2006.01) |
| *H01Q 21/06* | (2006.01) |
| *G01S 3/46* | (2006.01) |
| *G01S 3/48* | (2006.01) |
| *G01S 5/12* | (2006.01) |

(Continued)

(52) U.S. Cl.
CPC ............... *H01Q 3/267* (2013.01); *G01S 3/46* (2013.01); *G01S 3/48* (2013.01); *G01S 5/12* (2013.01); *H01Q 1/243* (2013.01); *H01Q 3/2605* (2013.01); *H01Q 13/16* (2013.01); *H01Q 21/064* (2013.01); *H01Q 1/526* (2013.01); *H01Q 9/00* (2013.01); *H01Q 9/0414* (2013.01); *H01Q 21/30* (2013.01)

(58) Field of Classification Search
CPC ...... H01Q 3/267; H01Q 13/16; H01Q 21/064; H01Q 1/243; H01Q 9/00; G01S 3/46; G01S 3/48
See application file for complete search history.

(56) References Cited

U.S. PATENT DOCUMENTS

| | | | | |
|---|---|---|---|---|
| 4,410,890 A | * | 10/1983 | Davis .................... | H01Q 13/10 342/419 |
| 4,682,180 A | * | 7/1987 | Gans ..................... | H01Q 13/18 343/769 |

(Continued)

*Primary Examiner* — Graham P Smith
*Assistant Examiner* — Jae K Kim
(74) *Attorney, Agent, or Firm* — Treyz Law Group, P.C.; Joseph F. Guihan

(57) ABSTRACT

An electronic device may be provided with wireless circuitry that includes antenna structures used to determine the position and orientation of the electronic device relative to external wireless equipment. The electronic device may include a housing having a planar conductive layer, a first slot antenna that includes a first bent slot element in the planar conductive layer, and a second slot antenna that includes a second bent slot element in the planar conductive layer. The first and second bent slot elements may be configured to receive radio-frequency signals at the same frequency. The first and second bent slot elements may have the same shape. The electronic device may include control circuitry configured to measure a phase difference between the radio-frequency signals received by the first and second slot antennas. The control circuitry may identify an angle of arrival of the received radio-frequency signals based on the measured phase difference.

15 Claims, 13 Drawing Sheets

(51) Int. Cl.
*H01Q 1/52* (2006.01)
*H01Q 9/00* (2006.01)
*H01Q 21/30* (2006.01)
*H01Q 9/04* (2006.01)

(56) References Cited

U.S. PATENT DOCUMENTS

| | | | |
|---|---|---|---|
| 6,417,807 B1* | 7/2002 | Hsu | H01Q 1/38 |
| | | | 333/262 |
| 6,727,857 B2 | 4/2004 | Mikkola et al. | |
| 6,798,384 B2 | 9/2004 | Aikawa et al. | |
| 7,477,201 B1* | 1/2009 | Bit-Babik | H01Q 5/00 |
| | | | 343/700 MS |
| 7,880,684 B2* | 2/2011 | Schantz | H01Q 3/24 |
| | | | 343/867 |
| 8,599,089 B2 | 12/2013 | Bevelacqua et al. | |
| 8,624,788 B2 | 1/2014 | Ayatollahi | |
| 9,236,648 B2* | 1/2016 | Guterman | H01Q 5/357 |
| 9,318,793 B2* | 4/2016 | Zhu | H01Q 1/44 |
| 10,236,559 B2* | 3/2019 | Han | H01Q 7/00 |
| 2010/0238079 A1* | 9/2010 | Ayatollahi | H01Q 1/38 |
| | | | 343/729 |
| 2011/0140977 A1* | 6/2011 | Yang | H01Q 13/10 |
| | | | 343/725 |
| 2013/0314293 A1* | 11/2013 | Wong | H01Q 1/521 |
| | | | 343/848 |
| 2014/0184450 A1* | 7/2014 | Koo | H01Q 5/335 |
| | | | 343/702 |
| 2014/0266928 A1* | 9/2014 | Gummalla | H01Q 1/44 |
| | | | 343/702 |
| 2015/0070228 A1* | 3/2015 | Gu | H01Q 1/2283 |
| | | | 343/727 |
| 2015/0268326 A1* | 9/2015 | Sung | H04W 64/00 |
| | | | 455/456.3 |
| 2015/0381229 A1* | 12/2015 | Tzanidis | H01Q 1/50 |
| | | | 455/73 |
| 2016/0056544 A1* | 2/2016 | Garcia | H01Q 1/38 |
| | | | 343/725 |
| 2016/0322699 A1* | 11/2016 | Mow | H01Q 5/321 |
| 2016/0344090 A1* | 11/2016 | Chiang | H01Q 1/243 |
| 2017/0012362 A1* | 1/2017 | Murch | H01Q 1/523 |
| 2017/0131380 A1* | 5/2017 | Malik | G01S 1/024 |

* cited by examiner

ELECTRONIC DEVICE ANTENNAS FOR PERFORMING ANGLE OF ARRIVAL DETECTION

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

Some electronic devices perform location detection operations to detect the location of an external device based on an angle of arrival of signals received from the external device (using multiple antennas). If care is not taken, the antennas can introduce systematic phase error that makes it difficult to accurately estimate the angle of arrival.

It would therefore be desirable to be able to provide wireless circuitry for electronic devices having improved angle of arrival detection capabilities.

SUMMARY

An electronic device may be provided with wireless circuitry and control circuitry. The wireless circuitry may include multiple antennas and transceiver circuitry. The wireless circuitry may include antenna structures used to determine the position and orientation of the electronic device relative to external wireless equipment. The antenna structures may determine the position and orientation of the electronic device relative to external wireless equipment at least in part by measuring the angle of arrival of radio-frequency signals from the external wireless equipment.

The electronic device may include a housing having a planar conductive layer, a first slot antenna that includes a first bent slot element in the planar conductive layer and a first antenna feed coupled across the first bent slot element, and a second slot antenna that includes a second bent slot element in the planar conductive layer and a second antenna feed coupled across the second bent slot element. The first and second bent slot elements may be configured to receive radio-frequency signals at the same frequency. The first bent slot element may have a first segment that extends along a longitudinal axis and the second bent slot element may have a second segment that extends along the longitudinal axis.

The electronic device may also include control circuitry configured to measure a phase difference between the radio-frequency signals received by the first and second slot antennas. The control circuitry may identify an angle of arrival of the received radio-frequency signals based on the measured phase difference. The electronic device may include an additional antenna to obtain additional measurements for determining angle of arrival.

The antenna structures for measuring angle of arrival may be formed by first and second openings in a planar conductive layer, a first substrate formed in the first opening, a second substrate formed in the second opening, a first antenna resonating element for a first antenna formed on the first substrate, and a second antenna resonating element for a second antenna formed on the second substrate. The first antenna resonating element may have a first shape and the second antenna resonating element may have a second shape that is the same as the first shape.

DETAILED DESCRIPTION

Figure 1:
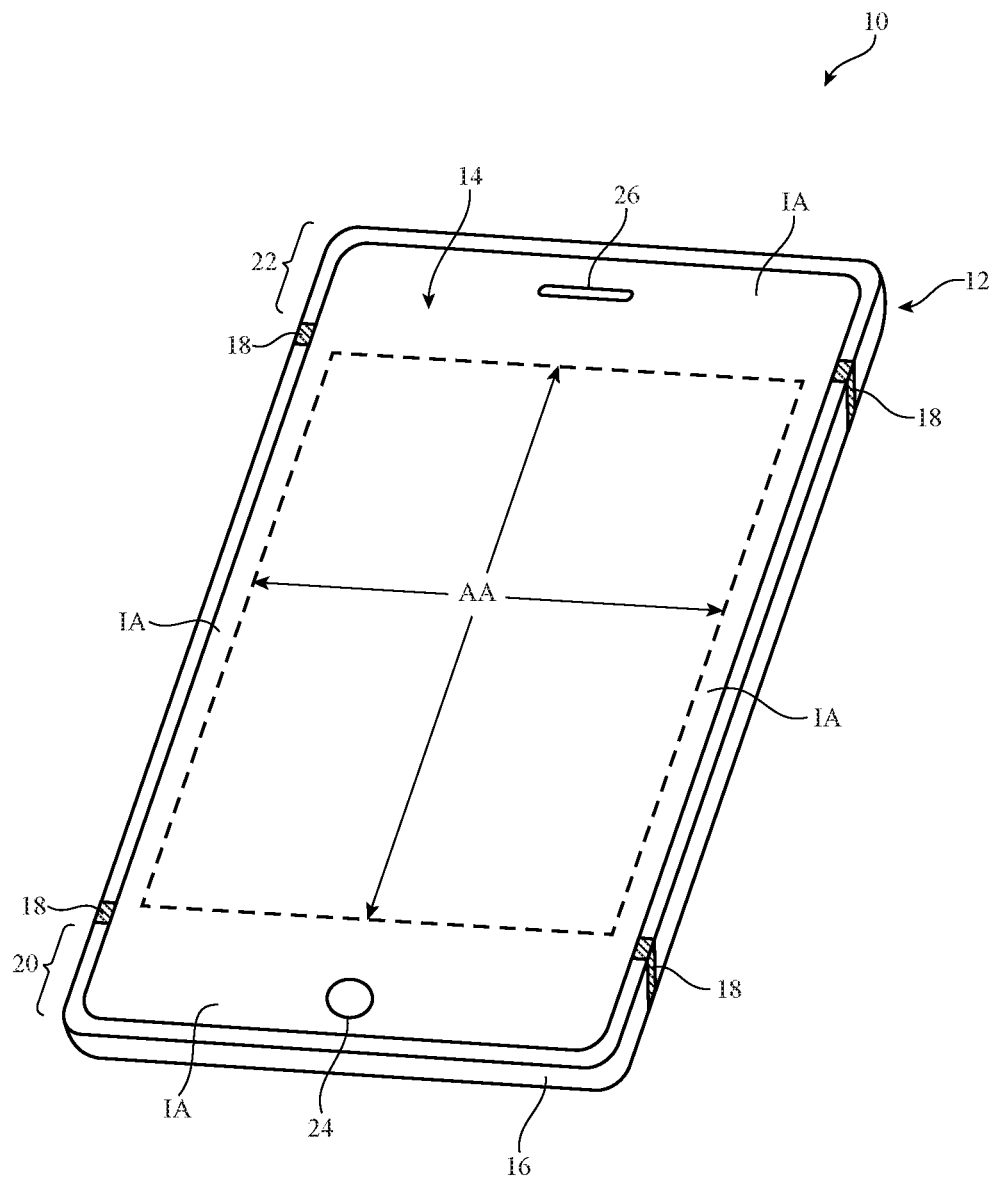
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a planar housing wall. The rear housing wall may have slots that pass entirely through the rear housing wall and that therefore separate housing wall portions (and/or sidewall portions) of housing 12 from each other. The rear housing wall may include conductive portions and/or dielectric portions. If desired, the rear housing wall may include a planar metal layer covered by a thin layer or coating of dielectric such as glass, plastic, sapphire, or ceramic. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer if desired. The cover layer may also have other openings such as an opening for speaker port 26.

Housing 12 may include peripheral housing structures such as structures 16 (sometimes referred to herein as peripheral housing structures, peripheral conductive housing structures, or peripheral structures). Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface or wall. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions. Peripheral conductive housing structures 16 and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 16 from view of the user).

Display 14 may have an array of pixels that form an active area AA that displays images for a user of device 10. An inactive border region such as inactive area IA may run along one or more of the peripheral edges of active area AA.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of member 16). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 16 and opposing conductive ground structures such as conductive portions of housing 12, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22.

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with peripheral gap structures. For example, peripheral conductive housing structures 16 may be provided with one or more peripheral gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four of gaps 18, etc.). The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
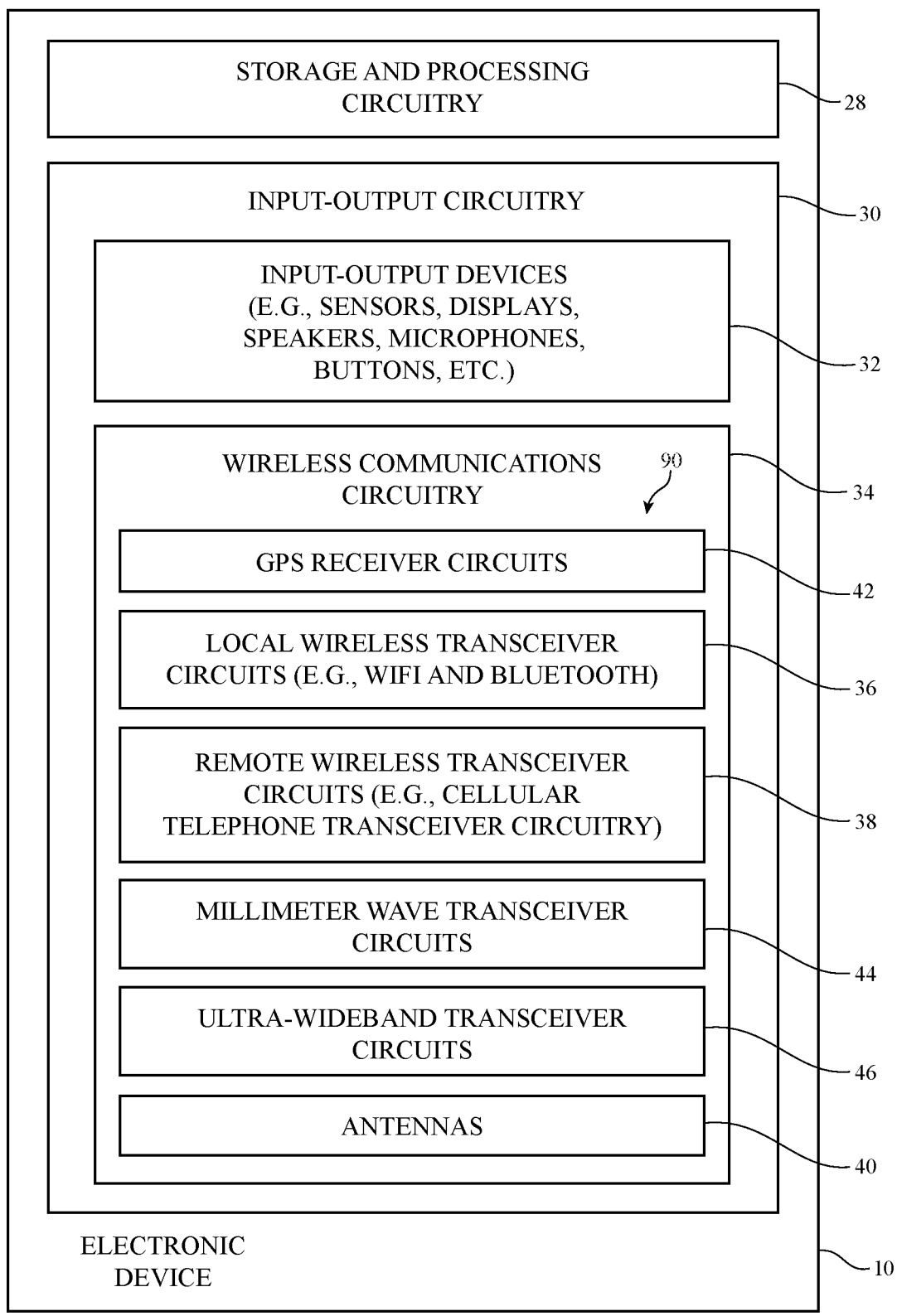
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28 (sometimes referred to herein as control circuitry 28 or circuitry 28). Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, radio-frequency transceiver circuitry 90 may include transceiver circuitry 36, 38, 42, 44, and 46. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Millimeter wave transceiver circuitry 44 (sometimes referred to as extremely high frequency (EHF) transceiver circuitry 44 or transceiver circuitry 44) may support communications at frequencies between about 10 GHz and 300 GHz. For example, transceiver circuitry 44 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, transceiver circuitry 44 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 44 may support IEEE 802.11ad communications at 60 GHz and/or $5^{th}$ generation mobile networks or $5^{th}$ generation wireless systems (5G) communications bands between 27 GHz and 90 GHz. If desired, circuitry 28 may support communications at multiple frequency bands between 10 GHz and 300 GHz such as a first band from 27.5 GHz to 28.5 GHz, a second band from 37 GHz to 41 GHz, and a third band from 57 GHz to 71 GHz, or other communications bands between 10 GHz and 300 GHz. Circuitry 44 may be formed from one or more integrated circuits (e.g., multiple integrated circuits mounted on a common printed circuit in a system-in-package device, one or more integrated circuits mounted on different substrates, etc.). While circuitry 44 is sometimes referred to herein as millimeter wave transceiver circuitry 44, millimeter wave transceiver circuitry 44 may handle communications at any desired communications bands at frequencies between 10 GHz and 300 GHz (e.g., in millimeter wave communications bands, centimeter wave communications bands, etc.).

Ultra-wideband transceiver circuitry 46 may support communications using the IEEE 802.15.4 protocol and/or other wireless communications protocols. Ultra-wideband wireless signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices. Transceiver circuitry 46 may operate in a 6.5 GHz frequency band, an 8 GHz frequency band, between 3.1 GHz and 10.6 GHz, and/or at other suitable frequencies.

Wireless communications circuitry 34 may include antennas 40. Antennas 40 in wireless communications circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include two or more antennas for handling ultra-wideband wireless communication.

Transmission line paths may be used to route antenna signals within device 10. For example, transmission line paths may be used to couple antenna structures 40 to transceiver circuitry 90. Transmission lines in device 10 may include coaxial probes realized by metalized vias, microstrip transmission lines, stripline transmission lines, edge-coupled microstrip transmission lines, edge-coupled stripline transmission lines, waveguide structures, transmission lines formed from combinations of transmission lines of these types, etc. Transmission lines in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Figure 3:
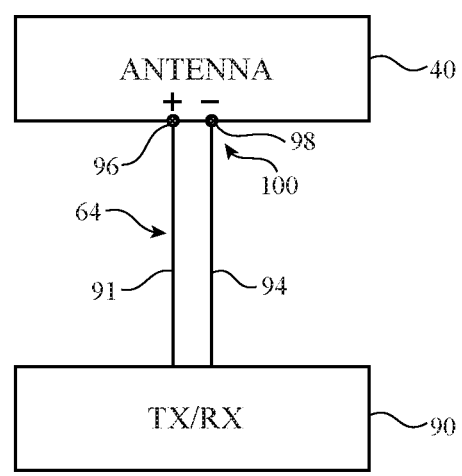
FIG. 3 is a diagram of illustrative wireless circuitry in accordance with an embodiment.

A schematic diagram of an antenna 40 coupled to transceiver circuitry 90 (e.g., transceiver circuitry 46) is shown in FIG. 3. As shown in FIG. 3, radio-frequency transceiver circuitry 90 may be coupled to antenna feed 100 of antenna 40 using transmission line 64. Antenna feed 100 may include a positive antenna feed terminal such as positive antenna feed terminal 96 and may include a ground antenna feed terminal such as ground antenna feed terminal 98. Transmission line 64 may be formed from metal traces on a printed circuit or other conductive structures and may have a positive transmission line signal path such as path 91 that is coupled to terminal 96 and a ground transmission line signal path such as path 94 that is coupled to terminal 98. Transmission line paths such as path 64 may be used to route antenna signals within device 10. For example, transmission line paths may be used to couple antenna structures such as one or more antennas to transceiver circuitry 90. Transmission lines in device 10 may include coaxial probes realized by metal vias, microstrip transmission lines, stripline transmission lines, edge-coupled microstrip transmission lines, edge-coupled stripline transmission lines, waveguide structures, transmission lines formed from combinations of transmission lines of these types, etc. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). Filter circuitry, switching circuitry, impedance matching circuitry, and other circuitry may be interposed within transmission line 64 and/or circuits such as these may be incorporated into antenna 40 if desired (e.g., to support antenna tuning, to support operation in desired frequency bands, etc.).

Figure 4:
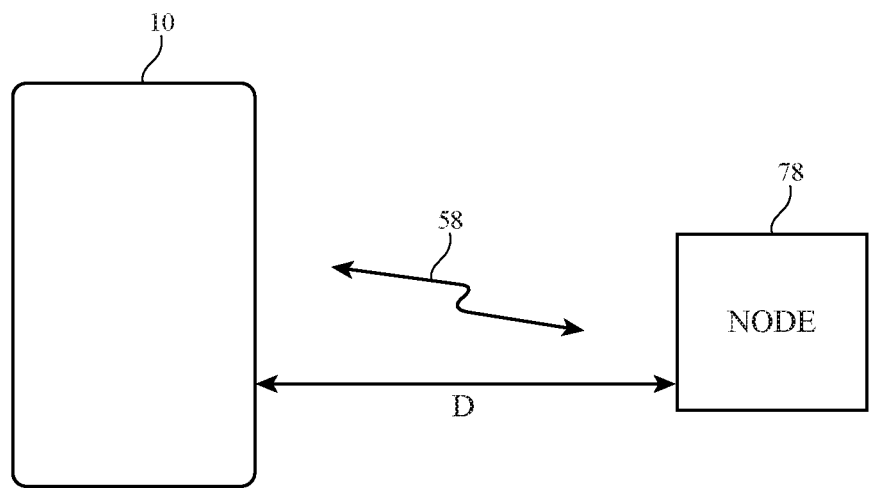
FIG. 4 is a diagram of an illustrative electronic device in wireless communication with an external node in a network in accordance with an embodiment.

During operation, electronic device 10 may communicate with external wireless equipment. If desired, electronic device 10 may use radio-frequency signals conveyed between electronic device 10 and the external wireless equipment to identify a location of the external wireless equipment relative to electronic device 10. Device 10 may identify the relative location of the external wireless equipment by identifying a range to the external wireless equipment (e.g., the distance between the external equipment and device 10) and the angle of arrival (AoA) of signals from external wireless equipment (e.g., the angle at which wireless signals are received from the external wireless equipment). FIG. 4 is a diagram showing how electronic device 10 may determine a distance D between the electronic device 10 and external wireless equipment such as wireless network node 78 (sometimes referred to herein as wireless equipment 78, wireless device 78, external device 78, or external equipment 78).

Node 78 may include devices that are capable of receiving and/or transmitting wireless signals such as signals 58. Node 78 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 2, including some or all of the same wireless communications capabilities as device 10). For example, node 78 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 78 may also be a set-top box, a camera device with wireless communications capabilities, a desktop computer, a display into which a computer or other processing circuitry has been integrated, a display without an integrated computer, or other suitable electronic equipment. Node 78 may also be a key fob, a wallet, a book, a pen, or other object that has been provided with a low-power transmitter (e.g., an RFID transmitter or other transmitter). Node 78 may be electronic equipment such as a thermostat, a smoke detector, a Bluetooth® Low Energy (Bluetooth LE) beacon, a WiFi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with node 78 using wireless signals 58. Wireless signals 58 may include Bluetooth® signals, near-field communications signals, wireless local area network signals such as IEEE 802.11 signals, millimeter wave communication signals such as signals at 60 GHz, ultra-wideband radio frequency signals, other radio-frequency wireless signals, infrared signals, etc. Wireless signals 58 may be used to determine and/or convey information such as location and orientation information. For example, control circuitry 28 in device 10 may determine the location of node 78 relative to device 10 using wireless signals 58.

In arrangements where node 78 is capable of sending or receiving communications signals, control circuitry 28 may determine distance D using wireless signals (e.g., signals 58 of FIG. 4). Control circuitry 28 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 28 may use information from Global Positioning System receiver circuitry 42, proximity sensors (e.g., infrared proximity sensors or other proximity sensors), image data from a camera, motion sensor data from motion sensors, and/or using other circuitry in device 10 to help determine distance D.

Figure 5:
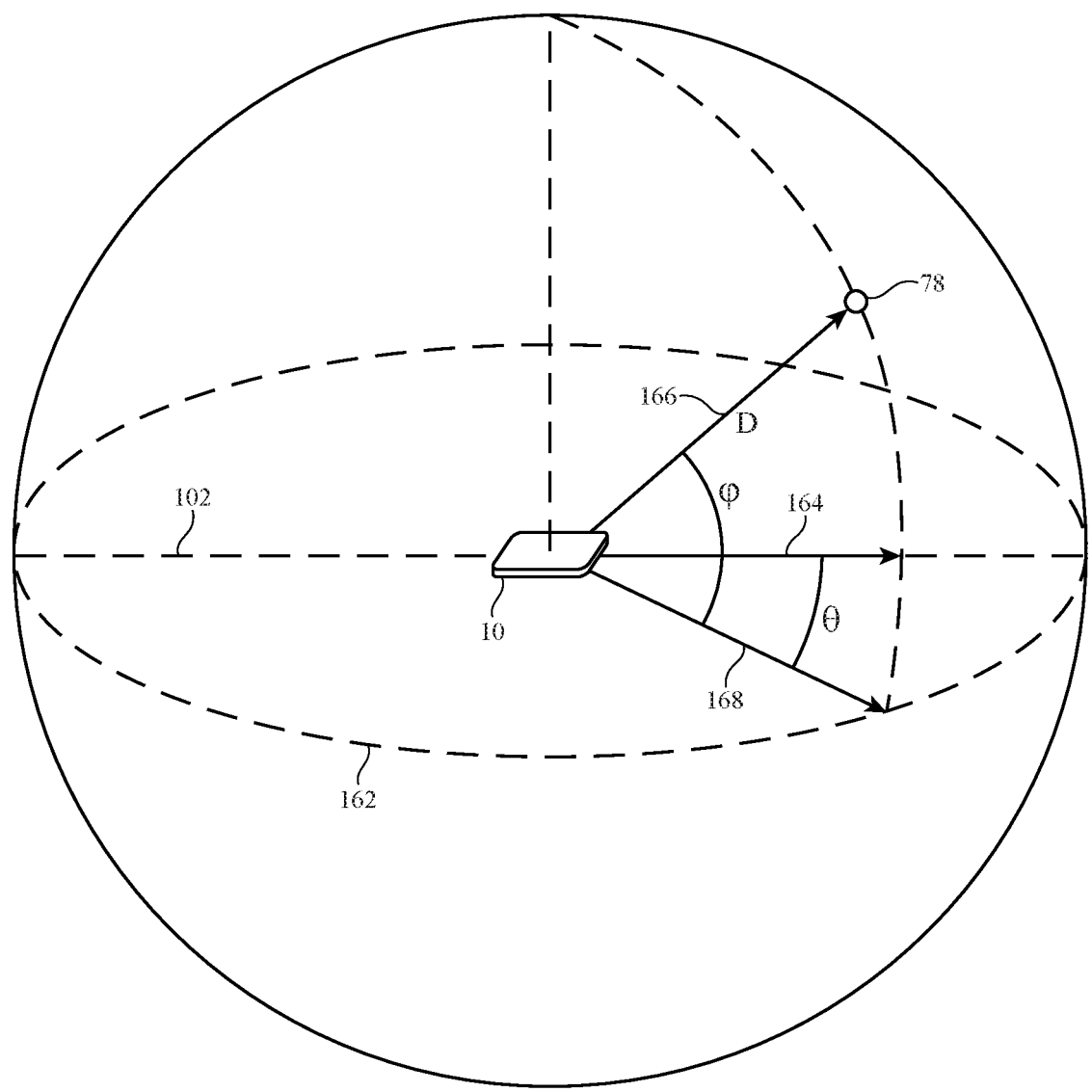
FIG. 5 is a diagram showing how the location (e.g., range and angle of arrival) of an external node in a network may be determined relative to an electronic device in accordance with an embodiment.

In addition to determining the distance D between device 10 and node 78, control circuitry 28 may be configured to determine the orientation of device 10 relative to node 78. FIG. 5 illustrates how the position and orientation of device 10 relative to nearby nodes such as node 78 may be determined. If desired, control circuitry 28 may use a horizontal coordinate system to determine the location and orientation of device 10 relative to node 78. In this type of coordinate system, control circuitry 28 may determine an azimuth angle θ and/or an elevation angle φ to describe the position of nearby nodes 78 relative to device 10. Control circuitry 28 may define a reference plane such as local horizon 162 and a reference vector such as reference vector 164. Local horizon 162 may be a plane that intersects device 10 and that is defined relative to a surface of device 10. For example, local horizon 162 may be a plane that is parallel to or coplanar with display 14 of device 10. Reference vector 164 (sometimes referred to as the "north" direction) may be a vector in local horizon 162. If desired, reference vector 164 may be aligned with longitudinal axis 102 of device 10 (e.g., an axis running lengthwise down the center of device 10). When reference vector 164 is aligned with longitudinal axis 102 of device 10, reference vector 164 may correspond to the direction in which device 10 is being pointed.

Azimuth angle θ and elevation angle φ may be measured relative to local horizon 162 and reference vector 164. As shown in FIG. 5, the elevation angle φ (sometimes referred to as altitude) of node 78 is the angle between node 78 and local horizon 162 of device 10 (e.g., the angle between vector 166 extending between device 10 and node 78 and a coplanar vector 168 extending between device 10 and horizon 162). The azimuth angle θ of node 78 is the angle of node 78 around local horizon 162 (e.g., the angle between reference vector 164 and vector 168). In the example of FIG. 5, the azimuth angle θ and elevation angle φ of node 78 are greater than 0°.

If desired, other axes besides longitudinal axis 102 may be used as reference vector 164. For example, control circuitry 28 may use a horizontal axis that is perpendicular to longitudinal axis 102 as reference vector 164. This may be useful in determining when nodes 78 are located next to a side portion of device 10 (e.g., when device 10 is oriented side-to-side with one of nodes 78).

After determining the orientation of device 10 relative to node 78, control circuitry 28 may take suitable action. For example, control circuitry 28 may send information to node 78, may request and/or receive information from 78, may use display 14 to display a visual indication of wireless pairing with node 78, may use speakers to generate an audio indication of wireless pairing with node 78, may use a vibrator, a haptic actuator, or other mechanical element to generate haptic output indicating wireless pairing with node 78, may use display 14 to display a visual indication of the location of node 78 relative to device 10, may use speakers to generate an audio indication of the location of node 78, may use a vibrator, a haptic actuator, or other mechanical element to generate haptic output indicating the location of node 78 and/or may take other suitable action.

In one suitable arrangement, electronic device may determine the distance between the electronic device 10 and node 78 and the orientation of electronic device 10 relative to node 78 using two or more ultra-wideband antennas. The ultra-wide band antennas may receive wireless communication signals from node 78. Time stamps in the wireless communication signals may be analyzed to determine the time of flight of the wireless communication signals and thereby determine the distance (range) between electronic device 10 and node 78. Additionally, angle of arrival (AoA) measurement techniques may be used to determine the orientation of electronic device 10 relative to node 78. In angle of arrival measurement, node 78 transmits a wireless signal to electronic device 10. Electronic device 10 measures a delay in arrival time of the wireless communication signal between the two or more ultra-wideband antennas. The delay in arrival time (e.g., the difference in received phase at each ultra-wideband antenna) can be used to determine the angle of arrival of the wireless communication signal (and therefore the angle of node 78 relative to electronic device 10). Once distance D and the angle of arrival have been determined, device 10 may have knowledge of the precise location of node 78 relative to device 10.

Figure 6:
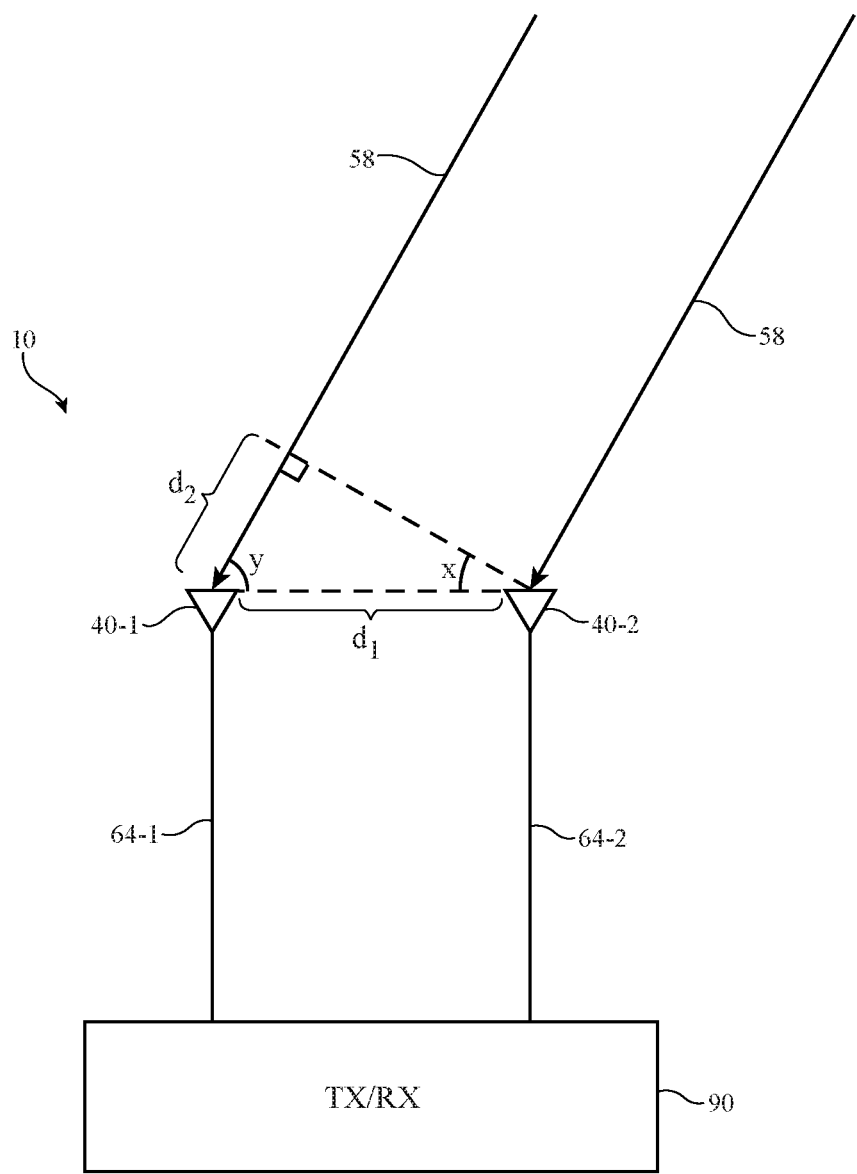
FIG. 6 is a diagram showing how illustrative antenna structures in an electronic device may be used for detecting angle of arrival in accordance with an embodiment.

FIG. 6 is a schematic diagram showing how angle of arrival measurement techniques may be used to determine the orientation of electronic device 10 relative to node 78. As shown in FIG. 6, electronic device 10 may include multiple antennas (e.g., a first antenna 40-1 and a second antenna 40-2) coupled to transceiver circuitry 90 by respective transmission lines 64 (e.g., a first transmission line 64-1 and a second transmission line 64-2). Antennas 40-1 and 40-2 may each receive a wireless signal 58 from node 78. Antennas 40-1 and 40-2 may be laterally separated by a distance $d_1$, where antenna 40-1 is farther away from node 78 than 40-2 (in the example of FIG. 6). Therefore, wireless communications signal 58 travels a greater distance to reach antenna 40-1 than 40-2. The additional distance between node 78 and antenna 40-1 is shown in FIG. 6 as distance $d_2$. FIG. 6 also shows angles x and y (where x+y=90°).

Distance $d_2$ may be determined as a function of angle φ or angle x (e.g., $d_2=d_1*\sin(x)$ or $d_2=d_1*\cos(y)$). Distance $d_2$ may also be determined as a function of the phase difference between the signal received by antenna 40-1 and the signal received by antenna 40-2 (e.g., $d_2=\Delta\phi*\lambda/(2*\pi)$, where $\Delta\phi$ is the phase difference between the signal received by antenna 40-1 and the signal received by antenna 40-2 and $\lambda$ is the wavelength of the received signal 58). Electronic device 10 may have phase measurement circuitry coupled to each antenna to measure the phase of the received signals and identify a difference in the phases ($\Delta\phi$). The two equations for $d_2$ may be set equal to each other (e.g., $d_1*\sin(x)=\Delta\phi*\lambda/(2*\pi)$) and rearranged to solve for the angle x (e.g., $x=\sin^{-1}(\Delta\phi*\lambda/(2*\pi*d_1))$) or y. Therefore, the angle of arrival may be determined (e.g., by control circuitry 28) based on the known (predetermined) distance between antennas 40-1 and 40-2, the detected (measured) phase difference between the signal received by antenna 40-1 and the signal received by antenna 40-2, and the known wavelength (frequency) of the received signals 58.

Distance $d_1$ may be selected to ease the calculation for phase difference between the signal received by antenna 40-1 and the signal received by antenna 40-2. For example, $d_1$ may be less than or equal to one half of the wavelength (e.g., effective wavelength) of the received signal 58 (e.g., to avoid multiple phase difference solutions).

With two antennas for determining angle of arrival (as in FIG. 6), the angle of arrival within a single plane may be determined. For example, antennas 40-1 and 40-2 in FIG. 6 may be used to determine azimuth angle θ. A third antenna may be included to enable angle of arrival determination in multiple planes (e.g., azimuth angle θ and elevation angle φ may both be determined).

To improve the accuracy of angle of arrival determination using antennas 40-1 and 40-2, it may be desirable for antennas 40-1 and 40-2 to have similar radiation patterns. Therefore, antennas 40-1 and 40-2 may have similar shapes and may convey signals with the same polarization if desired. Additionally, the accuracy of the angle of arrival determination may be optimized when antennas 40-1 and 40-2 are considered to operate as point sources (e.g., where the area spanned by the antenna radiating elements do not affect the phase difference measurement). Therefore, it may be desirable for antennas 40-1 and 40-2 to have as small an operating volume as possible.

Figure 7:
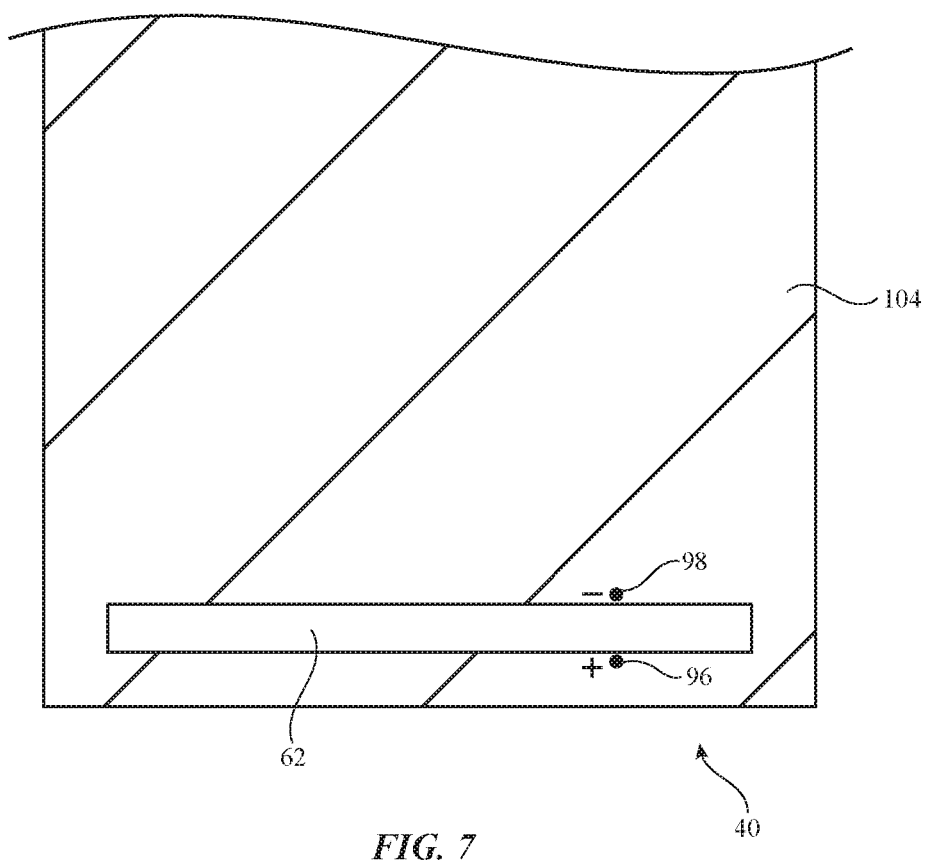
FIG. 7 is a diagram of an illustrative slot antenna in accordance with an embodiment.

In some arrangements, antennas 40-1 and 40-2 may be slot antennas that include one or more slot antenna elements. As shown in FIG. 7, for example, antenna 40 (e.g., a given one of antennas 40-1 or 40-2 of FIG. 6) may be based on a slot antenna configuration having an opening such as slot 62 that is formed within conductive structures such as antenna ground 104. In the configuration of FIG. 7, slot 62 is a closed slot, because portions of antenna ground 104 completely surround and enclose slot 62. Antenna ground 104 may be formed from housing structures such as a conductive support plate, printed circuit traces, conductive portions of a display, metal portions of electronic components, or other conductive ground structures. Slot 62 may be filled with air, plastic, and/or other dielectric. The shape of slot 62 may be straight or may have one or more bends (e.g., slot 62 may have an elongated shape following a meandering path). The antenna feed for antenna 40 may include positive antenna feed terminal 96 and ground antenna feed terminal 98. Feed terminals 96 and 98 may, for example, be located on opposing sides of slot 62 (e.g., on opposing long sides of slot 62). Slot 62 of FIG. 7 (sometimes referred to herein as slot antenna resonating element 62, slot resonating element 62, or slot element 62) may give rise to an antenna resonance at frequencies around a center frequency in which the wavelength of operation of the antenna is approximately equal to the perimeter of the slot. In narrow slots, the length of the slot may be approximately equal to half of the corresponding wavelength of operation. Harmonic modes of slot 62 may also be configured to cover desired frequency bands. In scenarios where slot 62 is an open slot (e.g., by forming an opening in the right-hand or left-hand end of antenna ground 104 so that slot 62 protrudes through antenna ground 104), the length of slot 62 may be approximately equal to one quarter of the effective wavelength of operation of antenna 40. If desired, the frequency response of antenna 40 can be tuned using one or more tunable components such as tunable inductors or tunable capacitors. These components may have terminals that are coupled to opposing sides of the slot (e.g., the tunable components may bridge the slot). If desired, tunable components may have terminals that are coupled to respective locations along the length of one of the sides of slot 62. Combinations of these arrangements may also be used.

Figure 8:
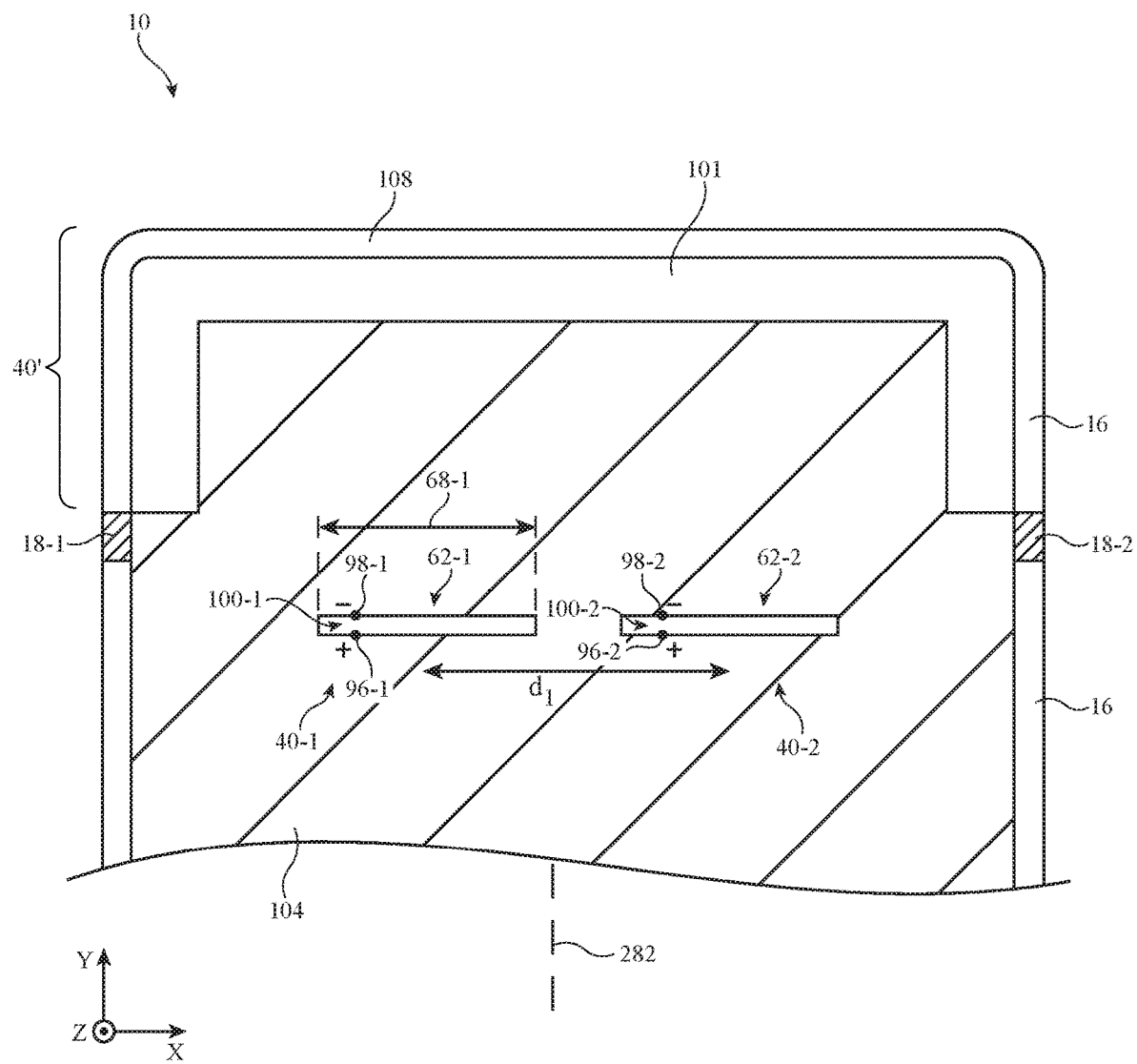
FIG. 8 is a top view of an illustrative electronic device having multiple horizontal slot antennas for measuring angle of arrival in accordance with an embodiment.

A top interior view of an illustrative portion of device 10 that contains antennas is shown in FIG. 8. As shown in FIG. 8, device 10 may have peripheral conductive housing structures such as peripheral conductive housing structures 16. Peripheral conductive housing structures 16 may be divided by dielectric-filled peripheral gaps (e.g., plastic gaps) 18 such as gaps 18-1 and 18-2. In some configurations, air and/or other dielectric may fill slot 101 between segment 108 of peripheral conductive housing structures 16 and ground structures 104. In one suitable arrangement, ground 104 has portions formed from conductive portions of housing 12 (e.g., portions of a rear wall of housing 12 and portions of peripheral conductive housing structures 16 that are separated from segment 108 by peripheral gaps 18-1 and 18-2). Antenna ground 104 may also have portions formed by portions of display 14 (e.g., conductive portions of a display panel, a conductive plate for supporting the display panel, and/or a conductive frame for supporting the conductive plate and/or the display panel).

Ground 104 may serve as antenna ground for one or more antennas 40 (e.g., at least a first slot antenna 40-1 and a second slot antenna 40-2). For example, slot antenna 40-1 may include a slot element 62-1 in ground 104, whereas slot antenna 40-2 may include a slot element 62-2 in ground 104. Slots 62-1 and 62-2 in antenna ground 104 may be filled with air, plastic, and/or other dielectric. Antenna 40-1 may be fed using antenna feed 100-1 having positive antenna feed terminal 96-1 coupled to a first side of slot 62-1 and ground antenna feed terminal 98-1 coupled to a second side of slot 62-1. Antenna 40-2 may be fed using antenna feed 100-2 having positive antenna feed terminal 96-2 coupled to a first side of slot 62-2 and ground antenna feed terminal 98-2 coupled to a second side of slot 62-2. Slot 62-1 may have a length 68-1 that is selected to be approximately equal to (e.g., within 15% of) half of the effective wavelength of operation of antennas 40-1 and 40-2. The effective wavelength of operation may take into account dielectric loading introduced by dielectric materials surrounding the antennas. In general, dielectric loading reduces the wavelength compared to free space. Slot 62-2 may have the same length as slot 62-1. Electronic device 10 may be characterized by longitudinal axis 282. Length 68-1 may extend perpendicular to longitudinal axis 282 (and the Y-axis of FIG. 8).

If desired, additional antenna structures such as antenna structures 40' may be included in electronic device 10. Antennas 40-1 and 40-2 may be ultra-wideband antennas used for angle of arrival measurements. Antennas 40-1 and 40-2 may cover any desired frequencies (e.g., a 6.5 GHz frequency band, an 8 GHz frequency band, between 3.1 GHz and 10.6 GHz, and/or any other suitable frequencies). Antenna structures 40' may convey radio-frequency signals in any desired frequencies (e.g., a 2.4 GHz band for WiFi® communications, a 5 GHz bands for WiFi® communications, a low communications band from 700 to 960 MHz, a low-midband from 960 to 1710 MHz, a midband from 1710 to 2170 MHz, a high band from 2300 to 2700 MHz, an ultra-high band from 3400 to 3700 MHz, GPS signals at 1575 MHz, or other suitable frequencies). Antenna structures 40' may include, if desired, an antenna ground formed from ground structures 104 and an antenna resonating element formed from segment 108 of peripheral conductive structures 16.

Antennas 40-1 and 40-2 may be ultra-wideband antennas used for angle of arrival measurements. Because antennas 40-1 and 40-2 are used for angle of arrival measurements, antennas 40-1 and 40-2 have the same shape (e.g., slots 62-1 and 62-2 have the same shape and dimensions). This may improve the accuracy of angle of arrivals determined by antennas 40-1 and 40-2. As discussed in connection with FIG. 6, it may be desirable for the centers of antennas 40-1 and 40-2 to be separated by a specific distance $d_1$ (e.g., half of the effective wavelength of radio-frequency signals conveyed with antennas 40-1 and 40-2). In the example of FIG. 8, both slots 62-1 and 62-2 extend perpendicular to longitudinal axis 282. Having slots 62-1 and 62-2 extend perpendicular to longitudinal axis 282 while maintaining a desired distance $d_1$ between slots 62-1 and 62-2 and ensuring structural integrity of antenna ground structures 104 and device 10 may be difficult. Therefore, other arrangements for antennas 40-1 and 40-2 may be used if desired.

Figure 9:
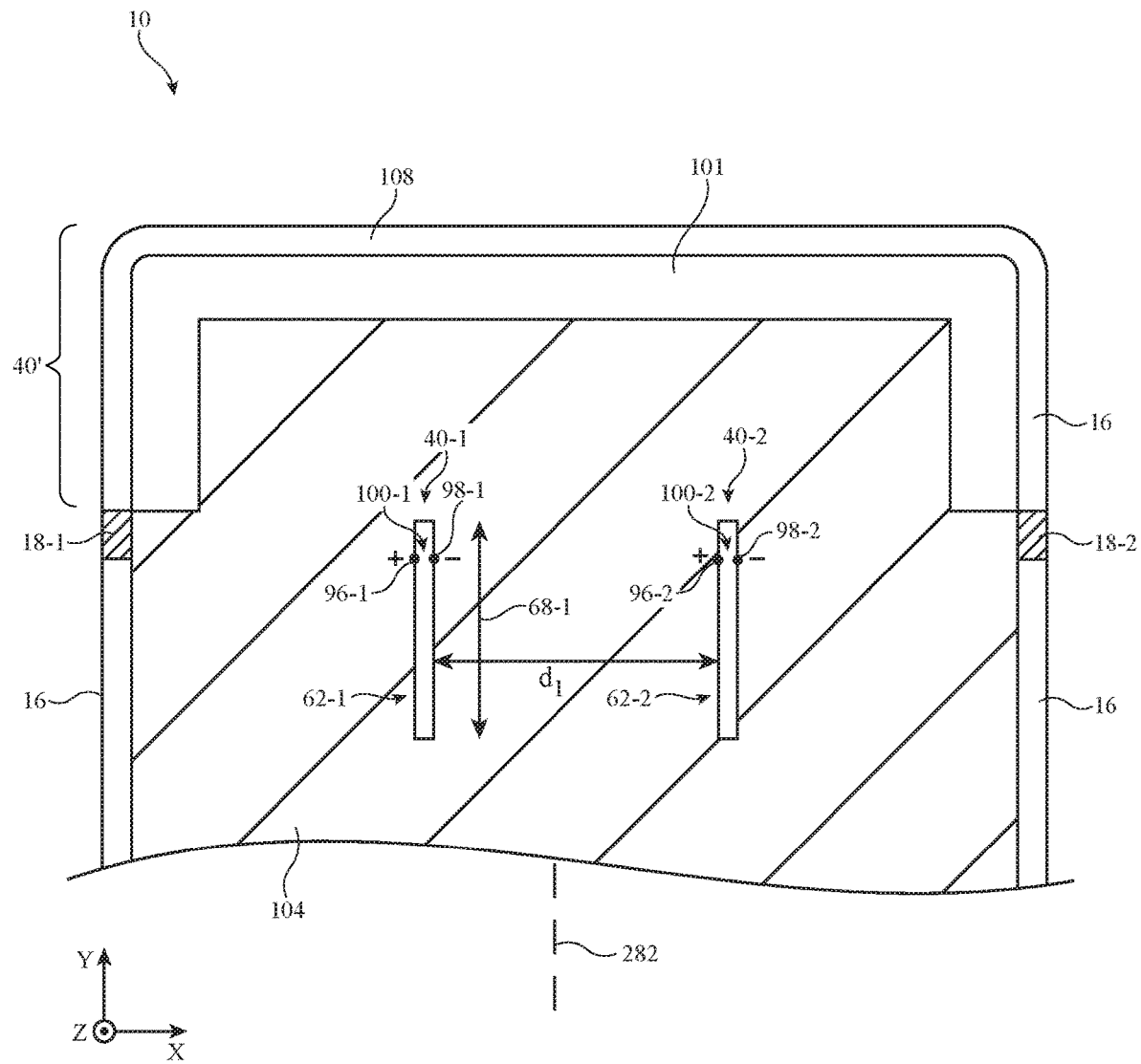
FIG. 9 is a top view of an illustrative electronic device having multiple vertical slot antennas for measuring angle of arrival in accordance with an embodiment.

FIG. 9 shows a similar arrangement to FIG. 8, with slot antennas 40-1 and 40-2 including slots 62-1 and 62-2 in ground structures 104. However, in FIG. 9, both slots 62-1 and 62-2 extend parallel to longitudinal axis 282 (and the Y-axis). This may allow slots 62-1 and 62-2 to be separated by a desired distance $d_1$ without sacrificing structural integrity of ground structures 104. Additionally, slots 62-1 and 62-2 in FIG. 9 still have the same shape and dimensions, thus improving the accuracy of angle of arrivals determined by antennas 40-1 and 40-2.

In the examples of FIGS. 8 and 9, the slots for antennas 40-1 and 40-2 are straight (e.g., slots 62-1 and 62-2 extend along a single length without any bends). These examples, however, are merely illustrative. To minimize the footprint of ground structures 104 occupied by antennas 40-1 and 40-2 (e.g., so that antennas 40-1 and 40-2 have as small an operating volume as possible to more closely resemble point sources for optimal angle of arrival estimation), slots 62-1 and 62-2 may have one or more bends as shown in FIG. 10.

Figure 10:
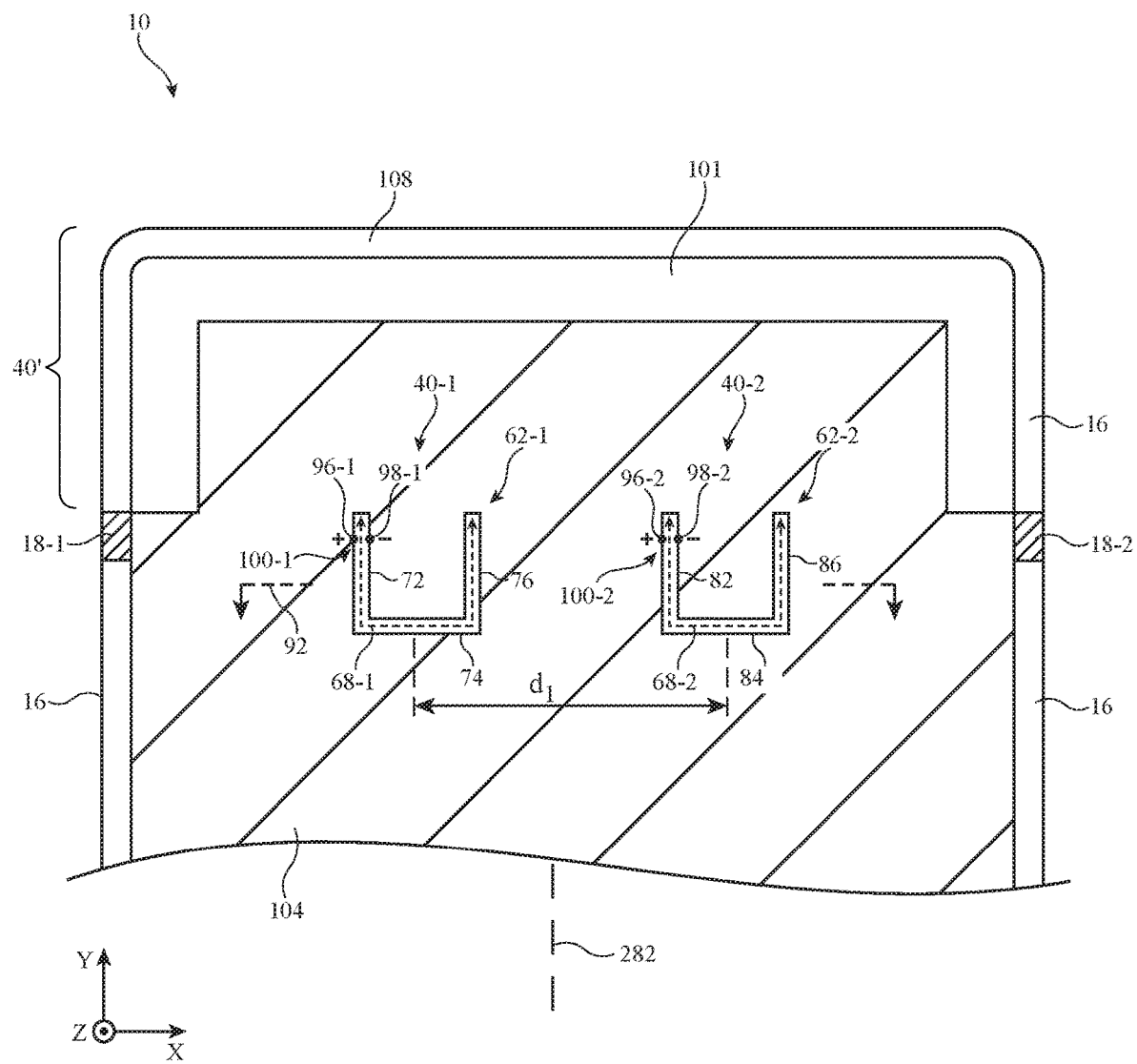
FIG. 10 is a top view of an illustrative electronic device having multiple bent slot antennas (e.g., "U" shaped or folded slot antennas) for measuring angle of arrival in accordance with an embodiment.

As shown in FIG. 10, antennas 40-1 and 40-2 may each have a corresponding U-shaped slot 62. Slots 62-1 and 62-2 may sometimes be referred to as slot elements or bent slot elements. Slot 62-1 of antenna 40-1 has a first slot portion 72 that extends parallel to longitudinal axis 282 (and the Y-axis), a second slot portion 74 that extends away from portion 72 perpendicular to longitudinal axis 282, and a third slot portion 76 that extends away from portion 74 parallel to longitudinal axis 282 and portion 72. The total length 68-1 of slot 62-1 (e.g., the summed length of slot portions 72, 74 and 76) may be selected to be approximately (e.g., within 15% of) half of the effective wavelength of the radio-frequency signals conveyed by antennas 40-1 and 40-2. The effective wavelength of operation may take into account dielectric loading introduced by dielectric materials surrounding the antennas. In general, dielectric loading reduces the wavelength compared to free space.

Slot 62-2 of antenna 40-2 has a first slot portion 82 that extends parallel to longitudinal axis 282 (and the Y-axis), a second slot portion 84 that extends away from portion 82 perpendicular to longitudinal axis 282, and a third slot portion 86 that extends away from portion 84 parallel to longitudinal axis 282 and portion 82. The total length 68-2 of slot 62-2 (e.g., the summed length of slot portions 82, 84 and 86) may be selected to be approximately half of the effective wavelength of the radio-frequency signals conveyed with antennas 40-2 and 40-1. Slot portion 84 of slot 62-2 may be aligned with slot portion 74 of slot 62-1 (e.g., slot portions 84 and 74 may share the same longitudinal axis). In the arrangement of FIG. 10, antenna feed 100-1 is coupled across first slot portion 72 of slot 62-1 and antenna feed 100-2 is coupled across first slot portion 82 of slot 62-2. This example is merely illustrative. In another possible arrangement, antenna feed 100-1 may be coupled across first slot portion 72 of slot 62-1 and antenna feed 100-2 may be coupled across third slot portion 86 of slot 62-2. Antenna feeds 100-1 and 100-2 may be coupled across any desired portion of respective slots 62-1 and 62-2.

Distance $d_1$ between antennas 40-1 and 40-2 may have any desired length (e.g., between 15 and 30 millimeters, between 10 and 40 millimeters, between 20 and 30 millimeters, between 24 and 28 millimeters, greater than 10 millimeters, less than 50 millimeters, etc.). Slot portions 72, 74, and 76 may have any desired lengths (e.g., about 5 millimeters, about 6 millimeters, between 4.5 and 5.5 millimeters, between 5.5 and 6.0 millimeters, between 5.0 and 6.0 millimeters, between 4 and 6 millimeters, between 3 and 10 millimeters, greater than 2 millimeters, less than 10 millimeters etc.). Antenna 40-2 may have the same shape and dimensions as antenna 40-1. Therefore slot portion 82 of slot 62-2 may have the same length as slot portion 72 of slot 62-1, slot portion 84 of slot 62-2 may have the same length as slot portion 74 of slot 62-1, and slot portion 86 of slot 62-2 may have the same length as slot portion 76 of slot 62-1.

The U-shaped slot 62-1 of antenna 40-1 may distribute currents on ground 104 such that the antenna currents around slot portion 72 cancel out with the antenna currents around slot portion 76. This may, for example, limit the polarization of antenna 40-1 to a single phase (e.g., a linear polarization from slot portion 74). Similarly, the U-shaped slot 62-2 of antenna 40-2 may distribute currents on ground 104 such that the antenna currents around slot portion 82 cancel out with the antenna currents around slot portion 86. This may, for example, limit the polarization of antenna 40-2 to a single phase (e.g., a linear polarization from slot portion 84). The U-shaped slots 62 of antennas 40-1 and 40-2 also reduce the effective volume of antennas 40-1 and 40-2 to the horizontal slot portions (e.g., portions 74 and 84), which allows antennas 40-1 and 40-2 to have as small an operating volume as possible to more closely resemble point sources for optimal angle of arrival estimation.

The examples of shapes for slots 62-1 and 62-2 in FIGS. 8-10 are merely illustrative. In general, slots 62-1 and 62-2 may have any desired shapes (e.g., with no bends, one bend, two bends, more than two bends, etc.). Additionally, more than two slots may be included. One or both of antennas 40-1 and 40-2 may be formed from other structures within the electronic device. One or both of antennas 40-1 and 40-2 may also be used to convey radio-frequency signals at other frequencies (e.g., antenna 40-1 and/or antenna 40-2 may convey radio-frequency signals in a first band for measuring angle of arrival and may convey radio-frequency signals in a second band that are not used for measuring angle of arrival). Both antennas 40-1 and 40-2 may be oriented at any desired angle relative to longitudinal axis 282. Both antennas 40-1 and 40-2 may include any desired number of curved and/or straight edges if desired.

The example of FIG. 10 where two antennas are used for measuring angle of arrival is merely illustrative. With two antennas for determining angle of arrival (as in FIG. 10), the angle of arrival within a single plane may be determined. For example, antennas 40-1 and 40-2 in FIG. 10 may be used to determine azimuth angle θ. However, one or more additional antennas in antenna structures 40' may be included to enable angle of arrival determination in multiple planes (e.g., azimuth angle θ and elevation angle φ may both be determined) and improve accuracy of the angle of arrival measurements. For example, in one illustrative example, antenna structures 40' in FIG. 10 include an additional antenna that is used for angle of arrival antenna measurements. The additional antenna may be positioned in a corner of electronic device 10 if desired. The additional antenna may be used for both angle of arrival measurements and other radio-frequency communication. In one suitable arrangement, antenna structures 40' may include an additional antenna in the corner of the electronic device that is used for angle of arrival measurements and for radio-frequency communication in a wireless local area network (WLAN) band (e.g., a 2.4 GHz WiFi® band, a 5 GHz WiFi® band, and/or another desired wireless local area network band).

Figure 11:
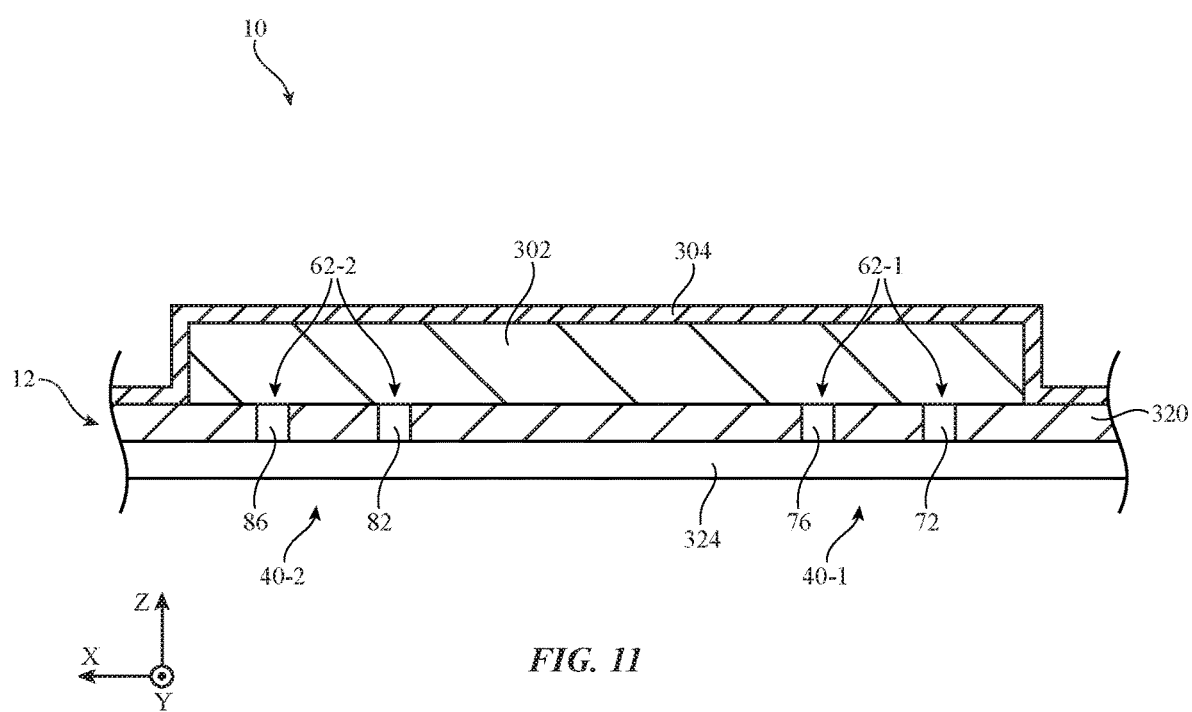
FIG. 11 is a cross-sectional side view showing illustrative antenna structures of the type shown in FIG. 10 in accordance with an embodiment.

FIG. 11 is a cross-sectional side view of electronic device 10 as taken along line 92 in FIG. 10. As shown in FIG. 11, housing 12 (FIG. 1) may include dielectric housing portions such as dielectric layer 324 and conductive housing portions such as conductive layer 320 (sometimes referred to herein as conductive housing wall 320). If desired, dielectric layer 324 may by formed under layer 320 such that layer 324 forms an exterior surface of device 10 (e.g., thereby protecting layer 320 from wear and/or hiding layer 320 from view of a user). Conductive housing portion 320 may form a portion of ground 104. As examples, conductive housing portion 320 may be a conductive support plate or wall (e.g., a conductive back plate or rear housing wall) for device 10. Conductive housing portion 320 may, if desired, extend across the width of device 10 (e.g., between two opposing sidewalls formed by peripheral housing structures 16). In one suitable arrangement, ground 104 includes both conductive portions of housing 12 (e.g., portions of a rear wall of housing 12 such as a conductive backplate 320 and portions of peripheral conductive housing structures 16 that are separated from segment 108 by peripheral gaps 18) as well as conductive portions of display 14 (e.g., conductive portions of display panel, a conductive plate that supports the display panel, and/or a conductive frame that supports the conductive plate and display panel). If desired, conductive housing portion 320 and the opposing sidewalls of device 10 may be formed from a single integral piece of metal or portion 320 may otherwise be shorted to the opposing sidewalls of device 10. Dielectric layer 324 may be a thin glass, sapphire, ceramic, or sapphire layer or other dielectric coating, as examples. In another suitable arrangement, layer 324 may be omitted if desired.

As shown in FIG. 11, slots 62-1 and 62-2 may be formed in conductive housing layer 320. A dielectric substrate 302 may be positioned adjacent to conductive housing layer 320 over slots 62-1 and 62-2. Dielectric substrate 302 may provide mechanical support within electronic device 10 (e.g., for conductive housing layer 320). Dielectric substrate 302 may also support antenna structures for antenna 40-1 and/or antenna 40-2. For example, dielectric substrate 302 may support transmission line structures for antenna 40-1, transmission line structures for antenna 40-2, structures for forming positive antenna feed terminal 96-1, structures for forming positive antenna feed terminal 96-2, structures for forming ground antenna feed terminal 98-1, and/or structures for forming ground antenna feed terminal 98-2. Dielectric substrate 302 may be formed from a polymer (e.g., polycarbonate-acrylonitrile butadiene styrene (PC-ABS) or any other desired material) and may sometimes be referred to as a plastic block.

To prevent components within electronic device 10 from being excited by radio-frequency signals conveyed using antennas 40-1 and 40-2, a conductive shielding layer such as shielding layer 304 may cover dielectric substrate 302. Without shielding layer 304, antenna currents may be induced on adjacent conductive components in device 10, which may serve to increase the effective volume of the antennas and limit the accuracy of the angle of arrival estimation. In addition, shielding layer 304 may prevent radio-frequency signals on the interior of electronic device 10 from interfering with radio-frequency signals conveyed using antennas 40-1 and 40-2. Shielding layer 304 may be formed from any desired material (e.g., copper, aluminum, ferrite, or another desired conductive material).

Figure 12:
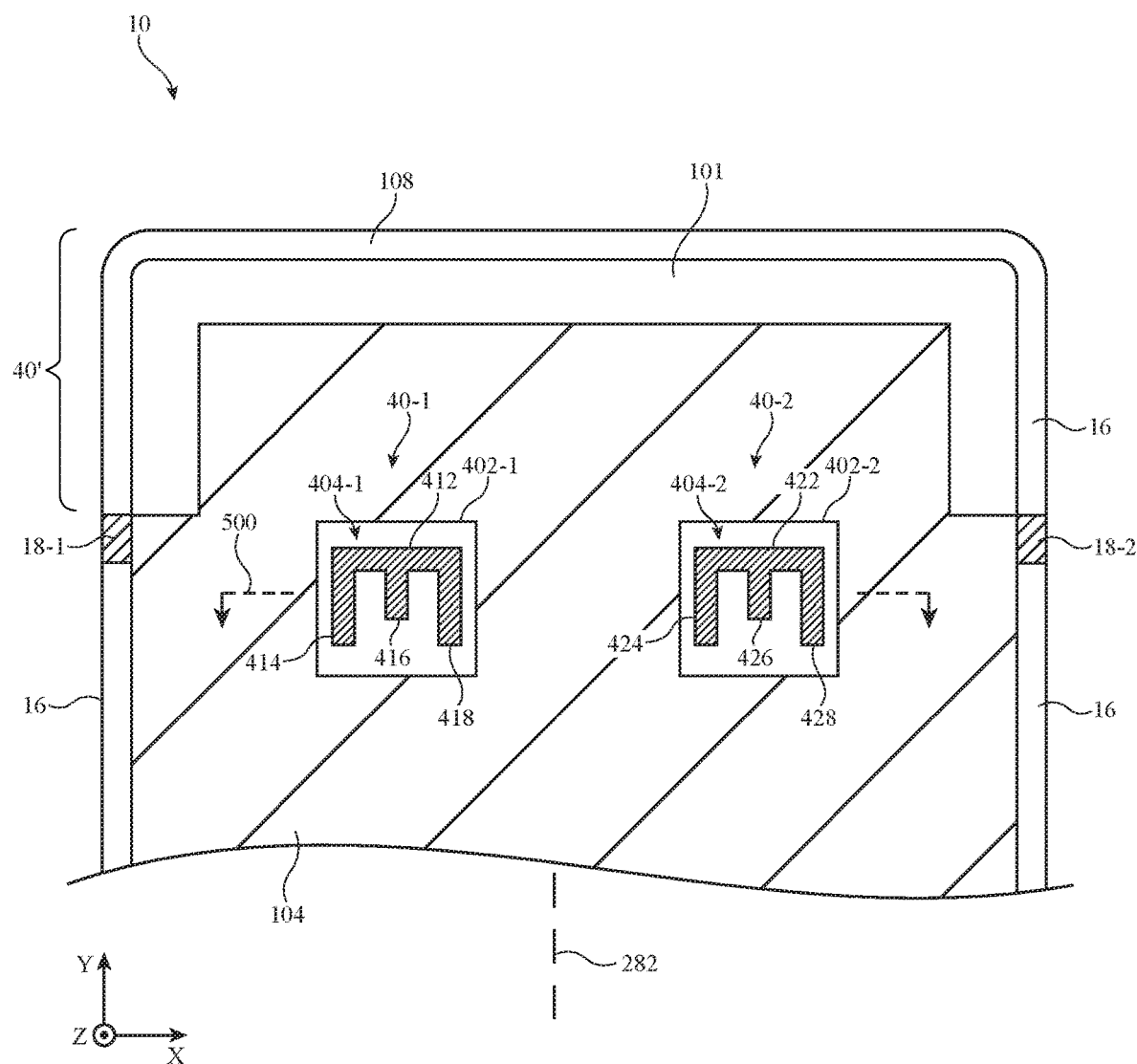
FIG. 12 is a top view of an illustrative electronic device having multiple multi-branch antennas for measuring angle of arrival in accordance with an embodiment.

The examples of FIGS. 8-11 where antennas 40-1 and 40-2 are formed from slots in conductive housing layer 320 is merely illustrative. If desired, antennas 40-1 and 40-2 may instead be formed from antenna elements that are not slot-based. As shown in FIG. 12, antenna 40-1 may include a corresponding antenna resonating element 404-1 formed on substrate 402-1 and antenna 40-2 may include a corresponding antenna resonating element 404-2 formed on substrate 402-2. Resonating elements 404-1 and 404-2 may, for example, be patch antenna resonating elements for antennas 40 (sometimes referred to herein as patch elements or conductive patches). Antenna resonating element 404-1 includes a first portion 412 that extends perpendicular to longitudinal axis 282 (and the Y-axis), a second portion 414 that extends away from first portion 412 parallel to longitudinal axis 282, a third portion 416 that extends away from first portion 412 parallel to longitudinal axis 282, and a fourth portion 418 that extends away from first portion 412 parallel to longitudinal axis 282. The second and fourth portions 414 and 418 of antenna resonating element 404-1 may be longer than third portion 416. The shape of antenna resonating element 404-1 (sometimes referred to as an "E-shape") in FIG. 12 is merely illustrative and antenna resonating element 404-1 may have any desired shape if desired. The E-shaped antenna resonating element may support radio-frequency communications in two or more frequency bands, as an example.

Antenna resonating element 404-2 includes a first portion 422 that extends perpendicular to longitudinal axis 282 (and the Y-axis), a second portion 424 that extends away from first portion 422 parallel to longitudinal axis 282, a third portion 426 that extends away from first portion 422 parallel to longitudinal axis 282, and a fourth portion 428 that extends away from first portion 412 parallel to longitudinal axis 282. The second and fourth portions 424 and 428 of antenna resonating element 404-2 may be longer than third portion 426.

Substrates 402-1 and 402-2 may be aligned with (e.g., formed within) openings in antenna ground 104. Antenna resonating element 404-1 may be formed by conductive traces on substrate 402-1 and antenna resonating element 404-2 may be formed by conductive traces on substrate 402-2.

Figure 13:
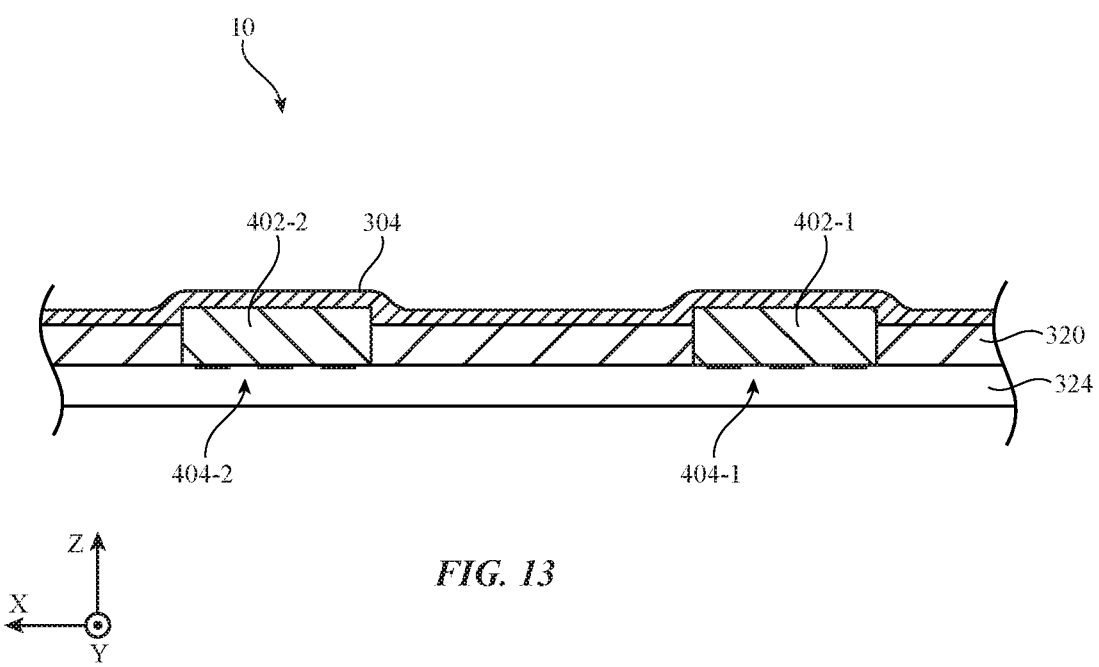
FIG. 13 is a cross-sectional side view showing illustrative antenna structures of the type shown in FIG. 12 in accordance with an embodiment.

FIG. 13 is a cross-sectional side view of electronic device 10 as taken along line 500 in FIG. 12. As shown, substrates 402-1 and 402-2 may be formed in openings in conductive housing layer 320. Substrates 402-1 and 402-2 may support conductive traces for antenna resonating elements 404-1 and 404-1. The substrates 402-1 and 402-2 may be formed from any desired material (e.g., ceramic, plastic, etc.). Shielding layer 304 may cover substrates 402-1 and 402-2.

The examples of FIGS. 8-13 where two antennas are used for angle of arrival determination are merely illustrative. With two antennas for determining angle of arrival (as in FIGS. 8-13), the angle of arrival within a single plane may be determined. For example, antennas 40-1 and 40-2 in FIGS. 8-13 may be used to determine azimuth angle θ. However, one or more additional antennas in the antenna structures of FIGS. 8-13 may be included to enable angle of arrival determination in multiple planes (e.g., azimuth angle θ and elevation angle φ may both be determined) and improve accuracy of the angle of arrival measurements. In some arrangements, an antenna may be used for both angle of arrival measurements and other radio-frequency communication.

When arranged as shown in FIGS. 8-13, received signals of different polarizations are relatively uniform. For example, error in the detected angle of arrival with respect to incident polarization may be within a margin of error of 10° or less of the actual angle of arrival over all azimuthal and elevation angles. The effect of polarization on angle of arrival measurements may be minimal across a field-of-view of approximately 120° along azimuth angle θ and approximately 120° along elevation angle φ, as examples.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   a housing having a planar conductive layer;
   a first slot antenna that includes a first bent slot element in the planar conductive layer and a first antenna feed coupled across the first bent slot elements wherein the first bent slot element is completely enclosed by the planar conductive layer;
   and
   a second slot antenna that includes a second bent slot element in the planar conductive layer and a second antenna feed coupled across the second bent slot element, wherein the second bent slot element is completely enclosed by the planar conductive layer, the first and second bent slot elements are configured to receive radiofrequency signals at the same frequency, the first bent slot element has a first segment that extends along a longitudinal axis, and the second bent slot element has a second segment that extends along the longitudinal axis.

2. The electronic device defined in claim 1, wherein the first bent slot element has a third segment that extends away from the first segment perpendicular to the first segment and a fourth segment that extends away from the first segment perpendicular to the first segment and parallel to the third segment.

3. The electronic device defined in claim 2, wherein the second bent slot element has a fifth segment that extends away from the second segment perpendicular to the second segment and a sixth segment that extends away from the second segment perpendicular to the second segment and parallel to the fifth segment.

4. The electronic device defined in claim 3, wherein the first antenna feed is coupled across the third segment of the first bent slot element and the second antenna feed is coupled across a selected one of the fifth segment and the sixth segment of the second bent slot element.

5. The electronic device defined in claim 3, wherein the first, third, and fourth segments of the first bent slot element have a first total length that is approximately equal to half of an effective wavelength of the received radio-frequency signals and the second, fifth, and sixth segments of the second bent slot element have a second total length that is approximately equal to half of the effective wavelength of the received radio-frequency signals.

6. The electronic device defined in claim 3, further comprising:
   control circuitry configured to measure a phase difference between the radio-frequency signals received by the first and second slot antennas and configured to identify an angle of arrival of the received radio-frequency signals based on the measured phase difference.

7. The electronic device defined in claim 6, further comprising:
   an additional antenna configured to receive radio-frequency signals at the same frequency as the first and second slot antennas, wherein the control circuitry is further configured to identify the angle of arrival of the received radio-frequency signals based on the radio-frequency signals received by the additional antenna.

8. The electronic device defined in claim 3, wherein the first bent slot element is separated from the second bent slot element by a distance that is less than or equal to half of an effective wavelength of the received radio-frequency signals.

9. The electronic device defined in claim 1, further comprising:
   a dielectric substrate adjacent to the planar conductive layer that covers the first and second bent slot elements.

10. The electronic device defined in claim 9, further comprising:
    a shielding layer that covers the dielectric substrate and provides radio-frequency shielding for the first and second bent slot elements.

11. The electronic device defined in claim 1, wherein the housing includes a dielectric layer that covers the planar conductive layer and forms an exterior surface of the electronic device.

12. An electronic device configured to receive wireless signals from external wireless equipment, the electronic device comprising: a planar conductive layer;
    a first slot antenna that includes a first closed, U-shaped slot in the planar conductive layer and a first antenna feed coupled across the first closed U-shaped slot;
    a second slot antenna that includes a second closed, U-shaped slot in the planar conductive layer and a second antenna feed coupled across the second closed, U-shaped dot, wherein the first and second dot antennas are configured to receive the wireless signals from the external wireless equipment; and
    control circuitry configured to measure a phase difference between the wireless signals received by the first and second dot antennas and configured to identify an angle of arrival of the received wireless signals based on the measured phase difference.

13. The electronic device defined in claim 12, wherein the first closed, U-shaped slot has a first shape and a first size and the second closed, U-shaped slot has a second shape that is the same as the first shape and a second size that is the same as the first size.

14. The electronic device defined in claim 12, wherein the first and second slots are first and second U-shaped slots, respectively.

15. The electronic device defined in claim 12, further comprising:
   an additional antenna configured to convey radio-frequency signals in a wireless local area network band, wherein the control circuitry is further configured to identify an angle of arrival of the received wireless signals based on the wireless signals received by the additional antenna.

* * * * *

UNITED STATES PATENT AND TRADEMARK OFFICE
CERTIFICATE OF CORRECTION

PATENT NO. : 10,903,566 B2
APPLICATION NO. : 15/718288
DATED : January 26, 2021
INVENTOR(S) : Carlo Di Nallo et al.

Page 1 of 1

It is certified that error appears in the above-identified patent and that said Letters Patent is hereby corrected as shown below:

In the Claims

Column 20, Line 60, Claim 12 "U-shaped dot, wherein the first and second dot antennas" should read -- U-shaped slot, wherein the first and second slot antennas --

Column 20, Line 65, Claim 12 "dot" should read -- slot --

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*